(12) United States Patent
Polaert et al.

(10) Patent No.: US 8,571,139 B2
(45) Date of Patent: Oct. 29, 2013

(54) METHOD FOR TRACKING THE PHASE OF A SIGNAL MODULATED BY CONTINUOUS PHASE MODULATION AND SYNCHRONIZATION DEVICE IMPLEMENTING SAID METHOD

(75) Inventors: Jean Polaert, Vernouillet (FR); Nicolas Kozlovsky, Versailles (FR); Martial Kijewski, Guyancourt (FR)

(73) Assignee: Thales, Neuilly sur Seine (FR)

( * ) Notice: Subject to any disclaimer, the term of this patent is extended or adjusted under 35 U.S.C. 154(b) by 295 days.

(21) Appl. No.: 12/996,522

(22) PCT Filed: May 26, 2009

(86) PCT No.: PCT/EP2009/056382
§ 371 (c)(1),
(2), (4) Date: Mar. 23, 2011

(87) PCT Pub. No.: WO2009/147029
PCT Pub. Date: Dec. 10, 2009

(65) Prior Publication Data
US 2011/0170583 A1    Jul. 14, 2011

(30) Foreign Application Priority Data
Jun. 6, 2008  (FR) ..................................... 08 03171

(51) Int. Cl.
H03K 9/06    (2006.01)
(52) U.S. Cl.
USPC ......................................................... 375/322
(58) Field of Classification Search
USPC ................................................. 375/322–327
See application file for complete search history.

(56) References Cited

U.S. PATENT DOCUMENTS 5,495,510 A    2/1996    Kimiavi
6,075,408 A    6/2000    Kullstam et al.
(Continued)

FOREIGN PATENT DOCUMENTS

FR    2845546    4/2004

OTHER PUBLICATIONS

Shane M R et al: "Reduced complexity iterative demodulation and decoding of serial concatenated continuous phase modulation," Proceedings of IEEE International Conference on Communications—Apr. 28-May 2, 2002—New York, NY, USA, IEEE, Piscataway. NJ, USA, vol. 3, Apr. 28, 2002, pp. 1672-1676, XPOI0589771.

(Continued)

Primary Examiner — Don N Vo
(74) Attorney, Agent, or Firm — Baker & Hostetler LLP

(57) ABSTRACT

A method for tracking the phase of a signal modulated by a continuous phase modulation includes: a complex vector representative of the received signal is determined for each symbol period with an offset of a half symbol period relative to the symbol rate of the receiver; a level measurement is performed on two complex samples distributed with an offset roughly of a half symbol period either side of the instant of estimation of the complex vector; the complex vectors are associated with one of the points of the constellation of the modulation making it possible to find the point which is closest; average estimation of the offset of the phase is calculated by calculating the difference between the average estimation of the phase of the signal and the theoretical phase value associated with each point of the constellation; an absolute estimation and a differential estimation of the offset of the phase is calculated.

11 Claims, 5 Drawing Sheets

(56) References Cited

U.S. PATENT DOCUMENTS

| | | | |
|---|---|---|---|
| 6,816,716 B2* | 11/2004 | Shohara | 455/196.1 |
| 2005/0078743 A1* | 4/2005 | Shohara | 375/219 |
| 2005/0207519 A1* | 9/2005 | Phang et al. | 375/354 |
| 2006/0140308 A1* | 6/2006 | MacFarlane et al. | 375/326 |

OTHER PUBLICATIONS

Inhyoung Kim et al: "0ifferenti al 1-11 detection based timing recovery for continuous phase modulation," Vehicular Technology Conference, 1999 IEEE 49th Houston, TX, USA May 16-20, 1999, Iscataway, NJ, USA, IEEE, US, vol. 1, May 16, 1999, pp. 108-112, XP010341980.

Simon M K et al: "Bit Synchronization of Differentially Detected MSK and' GMSK," International Conference on Communications. Chicago, Jun. 23-26, 1985; [International Conference on Communications], New York, IEEE, US, vol. 2, Jun. 1, 1985, pp. 583-590, XP000795164.

Aulin T et al: "Synchronization Properties of Continuous Phase Modulation," Global Telecommunications Conference. Miami, Nov. 29-Dec. 2, 1982; [Global Telecommunications Conference]New York, I.E. E. E, US, vol. 2, Nov. 1, 1982, pp. 877-883, XP000793983.

Buda De R : "Coherent Demodulation O Frequency-Shift Keying With Low Deviation • Ratio" IEEE Transactions on Communications, IEEE Service Center, Piscataway, NJ. US, vol. COM-20, No. 3, Jun. 1, 1972, pp. 429-435, XP000758911.

Huber J et al: "Data-Aided Synchronization of Coherent CPM-Receivers," IEEE Transactions on Communications, IEEE Service Center, Piscataway, NJ, US, vol. 40, No. 1, Jan. 1, 1992, pp. 178-189, XP000274963.

* cited by examiner

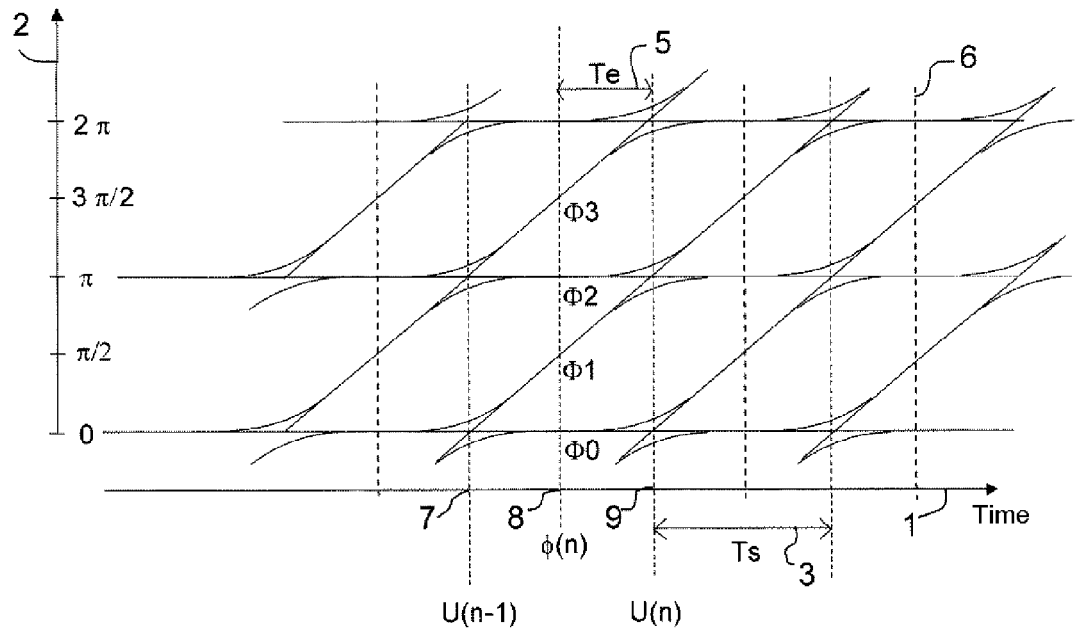
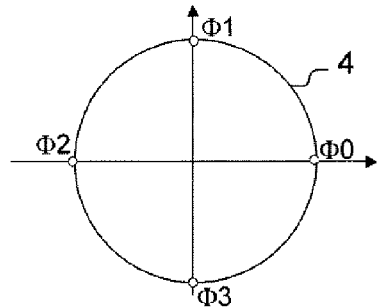
| Level U(n-1) | Level U(n) | Phase |
|---|---|---|
| +1 | +1 | Φ0 |
| +1 | −1 | Φ1 |
| −1 | +1 | Φ3 |
| −1 | −1 | Φ2 |
FIG.2

US 8,571,139 B2

METHOD FOR TRACKING THE PHASE OF A SIGNAL MODULATED BY CONTINUOUS PHASE MODULATION AND SYNCHRONIZATION DEVICE IMPLEMENTING SAID METHOD

CROSS-REFERENCE TO RELATED APPLICATIONS

This application is a National Stage of International patent application PCT/EP2009/056382, filed on May 26, 2009, which claims priority to foreign French patent application No. FR 08 03171, filed on Jun. 6, 2008, the disclosures of which are incorporated by reference in their entirety.

FIELD OF THE INVENTION

The invention relates to a method for tracking the phase of a signal modulated by continuous phase modulation and a synchronization device implementing the method. It applies notably to the field of digital communications.

BACKGROUND OF THE INVENTION

In a digital communication system, a signal is sent by a sender to a receiver via a transmission channel. The signal is modulated, which means that the characteristics of a carrier wave are varied so as to convey information (typically represented using binary symbols '0' and '1'). In the case of a phase modulation, the useful information is transmitted by varying the phase of the signal to be transmitted. The aim of the receiver is to demodulate the signal, that is to say to detect the variations of the phase of the signal in reception. Continuous phase modulations (CPM) form a particular family of the phase modulations for which the variations of the phase of the signal are conducted continuously from one symbol to another. For other types of phase modulations, such as M-PSK (modulation with M phase states, PSK standing for "Phase Shift Keying"), major variations in the phase of the signal can be observed between two symbols. These broaden the spectrum, in other words, the band occupied by the signal. With regard to continuous phase modulations, because they induce a continuous variation of the phase of the signal, they make it possible to obtain good performance levels in terms of spectral efficiency.

GMSK "Gaussian Minimum Shift Keying" modulation is a modulation belonging to the family of continuous phase modulations. This has the property of using a Gaussian filter used to filter the data before modulating the carrier wave. The effect of this filter is to render the phase transitions from one symbol to another more progressive than, for example, for an MSK ("Minimum Shift Keying") modulation. The characteristics of this modulation make it possible to effectively use the power amplifier on the sender side because the latter can work in a saturation area. These properties make GMSK modulation particularly suited to satellite transmissions. As an example, a future satellite navigation and data collection system will use this modulation coupled with a rate 1/2 convolutional encoder.

For a telecommunications system to function correctly, it is essential to synchronize the receiver on the received signal. In practice, if this is not the case, the reception performance levels will be degraded by notably increasing the bit error rate. Even if the sender and the receiver have their internal clocks synchronized on initialization of the communication, the situation may change over time. Taking the example of wireless telecommunications, when the sender and the receiver are in motion relative to one another, the Doppler effect introduces a frequency and time shift on the received signal. The loss of synchronization also has other causes, such as the imperfections of the oscillators used by the sender and the receiver. It is therefore necessary when designing a telecommunications system to consider this aspect and to use effective synchronization algorithms. One way of estimating the reliability of these algorithms is to compare their estimation performance levels with the Cramer-Rao limit. This limit indicates the greatest accuracy that can be obtained by an estimator.

The known synchronization methods for signals using a continuous phase modulation, such as the MSK or GMSK modulations, notably use these two types of methods.

The first method is called NDA (non data aided) and is derived from the method described by Rudi de Buda in his article "*Coherent Demodulation of Frequency-Shift Keying With Low Deviation Ratio*" (IEEE transactions on communications, June 1972). For example, the GMSK modulation with B.Ts=0.5, B.Ts being the product of the band of the signal and of the symbol period, can considered as a particular case of the FSK modulation at two frequencies F1 and F2. The method is based on the squaring of the modulated signal and can be used to find a ray at frequency 2*F1 and a ray at the frequency 2*F2. From these 2 rays, it is possible to find a carrier signal and a rate clock. The problem with this method is that, with a low Es/N0 ratio (ratio between the symbol energy and the power spectral density of reception noise) and because of the squaring, the phase noise is at a very high level which demands the use of phase-locked loops with a loop band reduced to a few Hertz, which is incompatible with the trend of the offset due to the Doppler effect in the case, for example, of a signal received by a satellite-borne receiver.

The second known method is to employ a pilot subcarrier or else a pilot sequence. The use of a subcarrier during the transmission of the data increases the complexity of the sender, and means that the sender can no longer function with saturation of its power amplifier. Because of this, for a given power supply power, there is less useful power available for the transmission of the data because of the presence of the subcarrier which detracts from this useful power and because of the necessary power back-off of the sender to generate the useful signal and the subcarrier without interfering intermodulations. The power back-off of a sender is the method which consists in employing its power amplifier with reduced input level, or backed off, to make it function in a quasi-linear region.

SUMMARY OF THE INVENTION

To this end, the subject of the invention is a method for tracking the phase of a signal modulated by an M-state continuous phase modulation, sampled so that at least two samples are obtained per symbol period and processed in portions of N symbols, said method being characterized in that:
  a complex vector V(n) representative of the state of amplitude and phase of the received signal is determined for each symbol period with an offset of a half symbol period relative to the symbol rate of the receiver;
  a level measurement is performed for each symbol period on the real or imaginary part of two complex samples U(n) and U(n−1) distributed with an offset roughly of a half symbol period either side of the instant of estimation of the complex vector V(n);
  the complex vectors V(n) are associated for each symbol period with one of the M points of the constellation of the continuous phase modulation by a mapping function which takes as input the levels of the samples U(n) and U(n−1) and makes it possible to find the point of the constellation which is closest;

an average estimation of the offset of the phase over a period of N symbols is calculated for each of the M points of the constellation of the continuous phase modulation by calculating the difference between the average estimation of the phase of the signal and the theoretical phase value associated with each point of the constellation of the continuous phase modulation;

an absolute estimation of the offset of the phase over a period of N symbols is calculated by calculating the average of the average estimations of the offset of the phase associated with each of the M points of the constellation of the continuous phase modulation;

a differential estimation of the offset of the phase over a period of N symbols is calculated by calculating the average of the average differences of the offset of the phase between consecutive points of the constellation.

A variant of this method is characterized in that the mapping function which can be used to associate the complex vectors V(n) with one of the M points of the constellation of the continuous phase modulation comprises a truth table based on the result of the projection of the complex samples U(n) and U(n−1) on the real or imaginary axis after having decided on a value according to the level detected, in other words, +1 for a projection level greater than 0 and −1 for a projection level less than 0, and mapping one of the M symbols of the constellation to a −1/+1 pair calculated for each pair of samples U(n) and U(n−1).

A variant of this method is characterized in that the received signal is equalized in frequency before the estimation of the complex vectors V(n).

A variant of this method is characterized in that the received signal is equalized before the samples U(n) and U(n−1) are processed by using an adaptive filter.

A variant of this method is characterized in that over the duration of the processing period for N symbols and for each point of the constellation, an average complex vector <Vi(n)> is calculated using the vectors Vi(n) associated with each of the points i of said constellation.

A variant of this method is characterized in that the argument of the average complex vectors <Vi(n)> associated with each of the M points of the constellation is compared to the theoretical argument of the associated point of the constellation and is used to estimate the average offset of the phase for each of the M points of the constellation.

Another subject of the invention is a method for synchronizing a signal modulated by an M-state continuous phase modulation, characterized in that it uses the tracking method and in that:

the phase of the received signal is corrected by configuring a phase-locked loop with the absolute estimation of the offset of the phase resulting from the application of the method;

the symbol rate of the receiver is corrected by configuring an all-pass filter with programmable delay with a time delay value calculated using the differential estimation of the offset of the phase resulting from the application of the method.

A variant of this method is characterized in that the time delay value used to track the symbol rate is calculated by using a proportional integral-type method.

A variant of this method is characterized in that the estimation and the correction of the phase of the signal are performed iteratively, that is to say a first absolute estimation of the offset of the phase is conducted on N symbols of the signal and, after correction of the phase applied to these N symbols, the residual error after correction is re-estimated for a second correction, the process being able to be thus repeated a given number of times.

A variant of this method is characterized in that the absolute offset of the phase estimated after several successive iterations is the sum of the offset of the phase estimations obtained after each iteration.

Another subject of the invention is a reception device implementing the synchronization method, said device being characterized in that it comprises at least:

a radio frequency circuit that can be used to convert the signal to baseband;

processing means implementing the synchronization method;

a memory area that can be used notably to store the complex vectors V(n), the levels of the samples U(n), the average estimations of the offset of the phase for each of the M points of the constellation of the modulation, and the overall average estimation of the offset of the phase over a period of N symbols.

BRIEF DESCRIPTION OF THE DRAWINGS

Other features and advantages of the invention will become apparent from the following description given as an illustrative and nonlimiting example, in light of the appended drawings in which:

FIG. 1 illustrates, in the case where the synchronization is established, the place of the phases of a GMSK signal in reception and the phase values that are potentially detectable by the receiver on an I/Q diagram;

FIG. 2 gives an exemplary truth table that can be used in the context of the invention;

DETAILED DESCRIPTION

Figure 3:
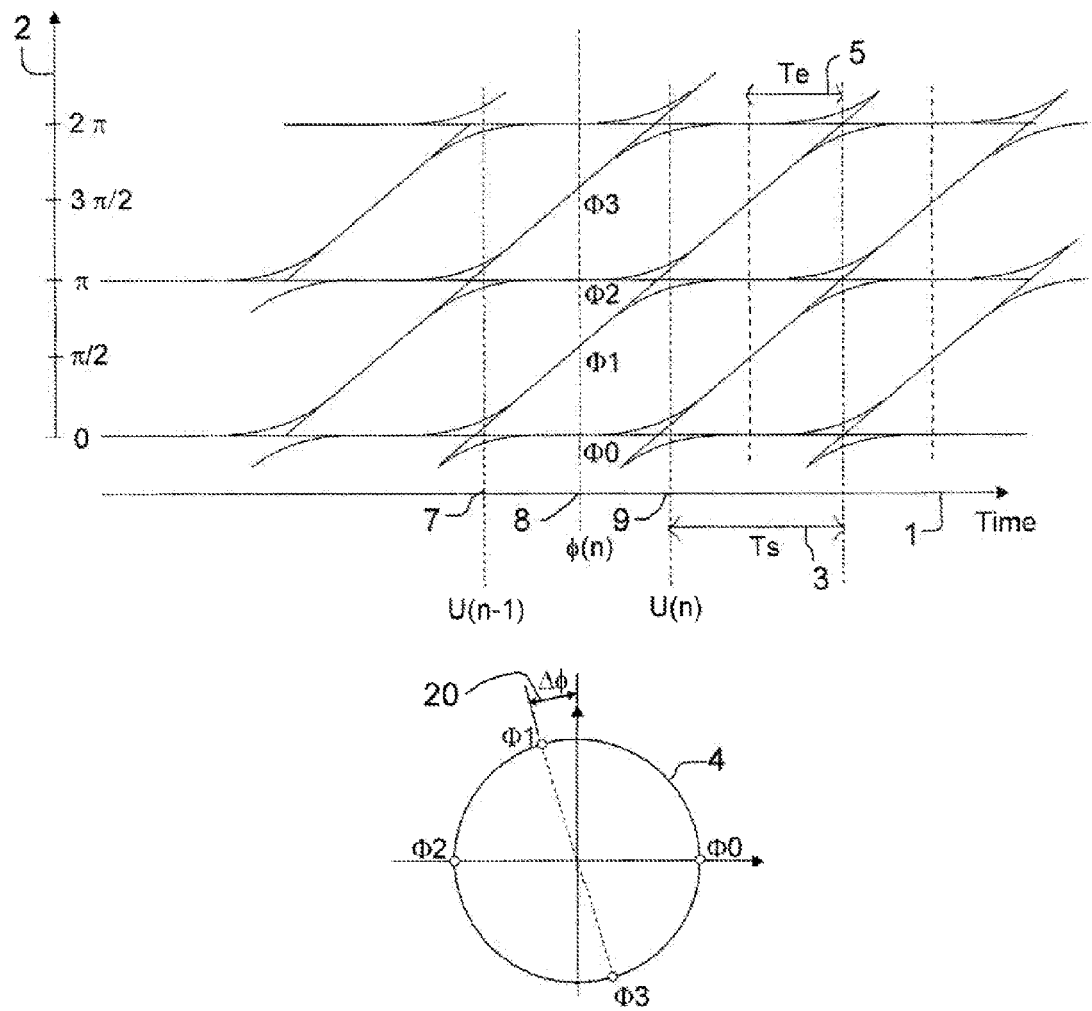
FIG. 3 illustrates, in the case where the synchronization is not established, the place of the phases of a GMSK signal in reception and the phase values that are potentially detectable by the receiver on an I/Q diagram.

The method according to the invention exploits the characteristics of the place of the phases of the continuous phase modulations. The place of the phases is the representation of the trend of the phase of the states of the modulation as a function of time. In order to describe the operation and advantages of the invention as clearly as possible, the example of GMSK modulation, already introduced previously, with, as configuration parameter, B.Ts=0.5, will be used hereinafter in the description.

As stressed previously, the GMSK modulation with B.Ts=0.5 is a particular case of FSK modulation with two frequencies F1 and F2 with continuous phase connection such that:

F2>F1;

F2−F1=0.5*D (with D representing the symbol rate expressed in symbols per second).

By convention, hereinafter in the description, the frequency F1 will be called carrier frequency.

FIG. 1 illustrates, in the case where the synchronization is established, the place of the phases of the signal in reception (also called Rimoldi representation), taking F1=0 Hertz. The same figure shows the phase values 4 which are potentially detectable by the receiver on an I/Q diagram. The time trend is represented on the x axis 1 and the phase trend on the y axis 2. The symbol period 3 is denoted Ts and the sample period 5, Te. In this example, the GMSK signal is sampled at a rate of 2 samples per symbol so as to observe the Nyquist criterion, or Ts=2*Te, but the method more generally functions with Ts=k.Te with k being an integer greater than 2. In the figure, the vertical dotted lines 6 indicate the sampling instants.

In the context of the invention, the phase of the received signal is measured in reception at the rate of one measurement per symbol period Ts: the receiver measures the phase of the signal $\phi(n)$ at the instant $(n-1)Ts+Ts/2$. In the example of GMSK modulation, the measurement of $\phi_0$ and of $\phi_2$ gives the phase of F1 modulo $\pi$ at the instant $(n-1)Ts+Ts/2$. Similarly, the measurement of $\phi_1$ and of $\phi_3$ gives the phase of F2 modulo $\pi$ at the instant $(n-1)Ts+Ts/2$. In the context of the invention, the phase of the signal at the nth measurement instant $\phi(n)$ corresponds to the phase of the signal at the instant $(n-1)Ts+Ts/2$. At this instant, a GMSK symbol can take 4 phase values, or $\phi_0$, $\phi_1$, $\phi_2$ or $\phi_3$. Since the receiver is correctly synchronized, $\phi(n)$ necessarily takes one of these four values. The receiver must associate the signal received over a period Ts with a symbol, that is to say, with a phase state. According to the invention, the received symbol is deduced from the level measured on the following complex samples 7, 9:

U(n−1): sample of signal 7 at the instant (n−1)Ts;
U(n): sample of signal 9 at the instant nTs.

The phase measurement is done with an offset of ½ Ts (symbol period) relative to the level sampling of U(n−1) and U(n) 7, 9.

The mapping between the estimated phase at the instant $(n-1)Ts+Ts/2$ and the estimated phase of the samples U(n−1) and U(n) is done, for example, using a truth table. The choice of the phase value received at the instant $(n-1)Ts+Ts/2$ is therefore chosen from the four possible values $\phi_0$, $\phi_1$, $\phi_2$ and $\phi_3$ that the symbols of the GMSK modulation can take and is based on the phase values estimated from the samples U(n−1) and U(n).

FIG. 2 shows an exemplary truth table that can be used to map the levels measured on the complex samples U(n−1) and U(n) at one of the points of the constellation of the continuous phase modulation concerned. A level measurement on the samples U(n−1) and U(n) can be done by, for example, performing a projection of the complex samples on the real axis or even the imaginary axis. The result of this projection is then observed, and a value is chosen according to the level detected, for example '+1' for a level greater than 0 and '−1' for a level less than 0.

In the case of a GMSK modulation, the points of the constellation can be characterized by their phase that can take four possible values $\phi_0$, $\phi_1$, $\phi_2$ and $\phi_3$. The truth table therefore maps one of these phase values to a '−1/+1' pair.

FIG. 3 represents the place of the phases assuming a desynchronization of the bit rate. It appears that an offset 20 on the phase $\phi(n)$ is consequently introduced. In practice, although the phase and the carrier frequency are known a priori at the start of the transmission, they may drift during the communication.

According to the invention, the method will estimate this offset of the phase over a period of N symbols. The offset of the phase at the instant $(n-1)Ts+Ts/2$ is denoted $\Delta\phi(n)$.

According to the invention, an estimation of the absolute offset of the phase $\Delta\phi_P$ is estimated for each block of N symbols with, for example, N=32 symbols.

Figure 4:
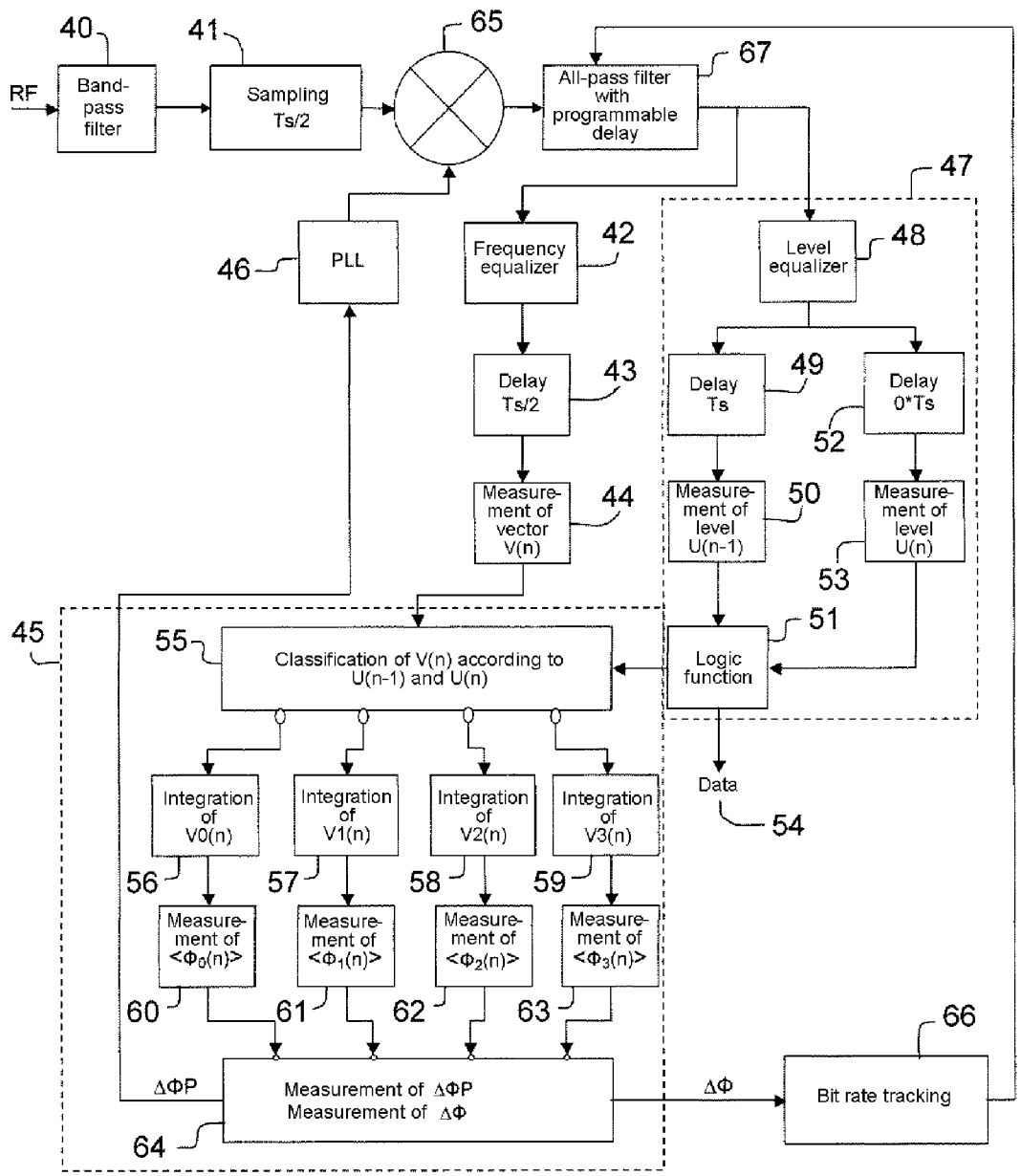
FIG. 4 illustrates an exemplary device implementing the method according to the invention with one iteration.

FIG. 4 presents an exemplary synchronization device implementing the method according to the invention. The functional blocks of the figure may be implanted in a device within hardware or software blocks. The method is implanted, for example, in a receiver. The GMSK signal is received and processed by a radio frequency circuit notably handling the transition to baseband and is then transmitted to a low-pass filter 40. The post-filtering signal is then sampled 41 at the frequency Fe=1/Te=2/Ts. A Costas loop is then put in place. This comprises:

a function 65 that can be used to correct the phase of the signal after sampling;

an all-pass filter with programmable delay 67 making it possible to produce a continuous, in other words without jerks, time slip, and correct the bit rate error introduced by the sampling;

a frequency equalizer 42 taking as input the signal after all-pass filtering 67 and offering a trade-off between the quality of the measurement with low Es/N0 and good accuracy with high Es/N0, said equalizer being produced with an all-pass digital filter in the case of a GMSK modulation, with B.Ts=0.5;

a function 43, taking as input the signal after frequency equalization 42, introducing a delay of Ts/2 on said signal;

a function 44, taking as input the signal after application of the delay of Ts/2 43, measuring a complex vector V(n), said vectors V(n) being representative of the states of the phase $\phi(n)$ and of the amplitude $A_n$ of the received signal at the instant $(n-1)*Ts+Ts/2$ and being able by using the complex notation:

$$V(n)=A_n e^{j\Phi(n)};$$

a function 45, taking as input the vectors V(n) calculated 44, producing the absolute estimation of the offset of the phase $\Delta\phi P$ and the differential estimation of the offset of the phase $\Delta\phi$ over a period of N symbols;

a phase-locked loop 46 (PLL), taking as input the estimation of the absolute offset of the phase $\Delta\phi_P$ and the output of which is used to correct 65 the phase of the signal after sampling.

The Costas loop is a well known method that can be used to perform a synchronous demodulation for which accurate control of the phase of the signal is required. The method according to the invention proposes a Costas loop modified by adding in parallel to the conventional Costas loop a set of functions 47 that can be used to measure the level of the samples U(n−1) and U(n). This set of functions breaks down as follows:

the signal at the output of the all-pass filter with programmable delay 67 is processed by a level equalizer 48, said level equalizer being an FIR filter serving, for example, as a filter matched to 3 branches and processing the signal giving priority to the quality of the decision in the presence of noise; the use of this filter and a detailed description of its use can be found in the article "*Reduced complexity iterative demodulation and decoding of serial concatenated continuous phase modulation*", Mark R. Shane, Richard D. Wesel, IEEE International Conference on Communications, 2002;

the signal resulting from the level equalization 48 is processed by a function 49 that introduces a delay Ts;

a measurement 50 of the level of the sample U(n−1), sample of signal 7 at the instant (n−1)Ts, is then carried out on the signal after application of the delay Ts 49; "level measurement" means that the complex signal sample is projected, for example, on the real axis; if this real value has a value greater than zero, the function 50 will present a '+1' at the output; if this real value has a value less than zero, the function 50 will present a '−1' at the output;

the signal resulting from the level equalization 48 is processed by a function 52 which introduces a delay 0*Ts;

a measurement 53 of the level of the sample U(n), sample of signal 9 at the instant n.Ts, is then carried out on the signal after application of the delay 0*Ts 52; "level measurement" means that the complex signal sample is projected, for example, on the real axis; if this real value has a value greater than zero, the function 53 will present a '+1' at the output; if this real value has a value less than zero, the function 53 will present a '−1' at the output;

the levels of U(n) and U(n−1) at the output of the level measurement functions 50, 53 are then processed by a logic function 51 that makes it possible to associate the level values of U(n) and U(n−1) with a point of the GMSK constellation; for this, the truth table represented in FIG. 2 can, for example, be used.

Knowledge of the levels of U(n−1) and of U(n), available at the output of the level measurement functions 50, 53, makes it possible to find the binary data carried by the signal 54.

The set of functions 45 handling the estimation of the offset of the phase $\Delta\phi_P$ over a period of N symbols comprises a function for classifying the vectors V(n) 55 using as input the vectors V(n) resulting from the measurement function 44 and the result of the logic function 51, for example an identifier of the point of the GMSK constellation associated with the vector V(n). This set of functions 45 also comprises a set of four integrating filters 56, 57, 58, 59 taking as input the vectors classified by the function for classifying the complex vectors V(n) 55 respectively consisting of four groups of vectors $V_0(n), V_1(n), V_2(n)$ and $V_3(n)$, each group being associated with a point of the GMSK constellation. Using these inputs, the integrating filters 56, 57, 58, 59 respectively calculate average vectors $<V_0(n)>, <V_1(n)>, <V_2(n)>$ and $<V_3(n)>$, the notation $<.>$ designating an average value calculated over N symbols. These average vectors supplied as output from the integrating filters 56, 57, 58, 59 are transmitted to a bank of measurement functions 60, 61, 62, 63, the aim of which is to respectively calculate the average of the angles $<\phi_0(n)>, <\phi_1(n)>, <\phi_2(n)>$ and $<\phi_3(n)>$ over N symbols. These averages can be deduced from the result of the integrating filters 56, 57, 58, 59 by using, for example, the following formulae:

$<\Phi_0(n)>=\arg\{<V_0(n)>\}$ $<\Phi_1(n)>=\arg\{<V_1(n)>\}$ $<\Phi_2(n)>=\arg\{<V_2(n)>\}$ $<\Phi_3(n)>=\arg\{<V_3(n)>\}$ It is also possible, in an alternative implementation of the method, to estimate the average value of the phases based on the average value of the phase of each vector, but in this case the estimation performance levels obtained will then be less good with low Eb/N0 ratio value.

In this case, the formulae become:

$<\Phi_0(n)>=<\arg\{V_0(n)\}>$ $<\Phi_1(n)>=<\arg\{V_1(n)\}>$ $<\Phi_2(n)>=<\arg\{V_2(n)\}>$ $<\Phi_3(n)>=<\arg\{V_3(n)\}>$ The average angles $<\phi_0(n)>, <\phi_1(n)>, <\phi_2(n)>$ and $<\phi_3(n)>$ at the output of the measurement functions 60, 61, 62, 63 are then used by a function 64 that makes it possible to determine an absolute value of the offset of the phase $\Delta\phi_P$ and a differential value of the offset of the phase $\Delta\phi$ for each block of N symbols by calculating the offset of the average values relative to their nominal values, the nominal values being the values of the phase of the points of the constellation, or 0, π2, π and 3π/4. The average offset can then be expressed for each of the points of the GMSK modulation by:

$\Delta\Phi_0 = 0 - <\Phi_0(n)>$ $\Delta\Phi_1 = \pi/2 - <\Phi_1(n)>$ $\Delta\Phi_2 = \pi - <\Phi_2(n)>$ $\Delta\Phi_3 = 3\cdot\pi/2 - <\Phi_3(n)>$ The absolute value of the offset of the phase $\Delta\phi_P$ over N symbols corresponding to the average slip of the constellation is deduced by using, for example, the following expression:

$$\Delta\Phi_P = \frac{1}{4}(\Delta\Phi_0 + \Delta\Phi_1 + \Delta\Phi_2 + \Delta\Phi_3)$$

This value is then transmitted as input to the phase-locked loop 46 in order to correct 65 the phase of the received signal by the estimated offset value.

The differential value of the offset of the phase $\Delta\phi$ is used in order to update the value of the bit rate applied by the receiver to the received signal. The latter is calculated by calculating the average of the average differences of the offset of the phase between consecutive points of the constellation. For the case of a four-state modulation such as GMSK, the following expression is used:

$$\Delta\Phi = \frac{1}{2}((\Delta\Phi_1 - \Delta\Phi_0) + (\Delta\Phi_3 - \Delta\Phi_2))$$

This value calculated by the calculation function of the offset of the phase 64 is used as input for a bit rate tracking function 66, the output of which is a time delay value, said value being calculated for example using a proportional integral type method, and is used in order to configure the FIR (Finite Impulse Response) filter 67, of all-pass type with programmable delay. The rate tracking is done by a servo-control function which keeps the value of the phase offset $\Delta\phi$ at zero. The programmable all-pass filter 67 makes it possible to produce a continuous, in other words without jerks, time slip.

Figure 5:
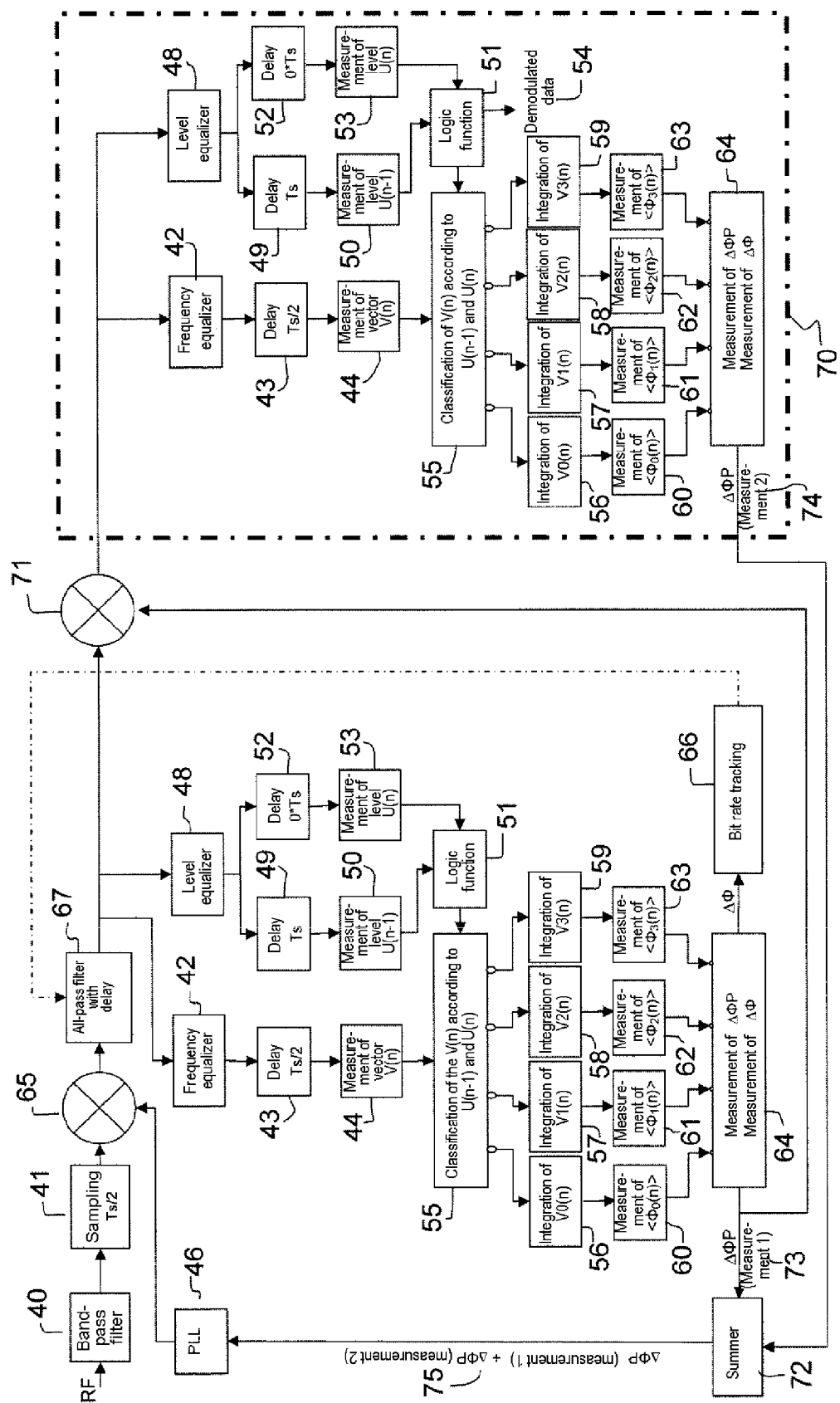
FIG. 5 illustrates an exemplary device implementing the method according to the invention with two iterations.

FIG. 5 illustrates a variant of the device presented in FIG. 4. One means of improving the phase measurement is to reiterate the measurement by rotating the reference phase by the previously measured value then remeasuring the phase. The offset of the phase estimated following this iteration is equal to $\Delta\phi_P$(first measurement)+$\Delta\phi_P$(second measurement). This process can be repeated several times. FIG. 5 illustrates this variant for the case where two iterations are performed. Some of the functional blocks of FIG. 4 described previously are duplicated 70 and take as input the signal after all-pass filtering 67 and phase correction 71 by using the first absolute estimation $\Delta\phi_P$ 73. A second measurement of $\Delta\phi_P$ 74 is obtained and added to the first using an adder function 72. The sum of the two measurements 75 is used as input for the phase-locked loop 46 in order to correct the phase 65 of the received signal after sampling.

Figure 6:
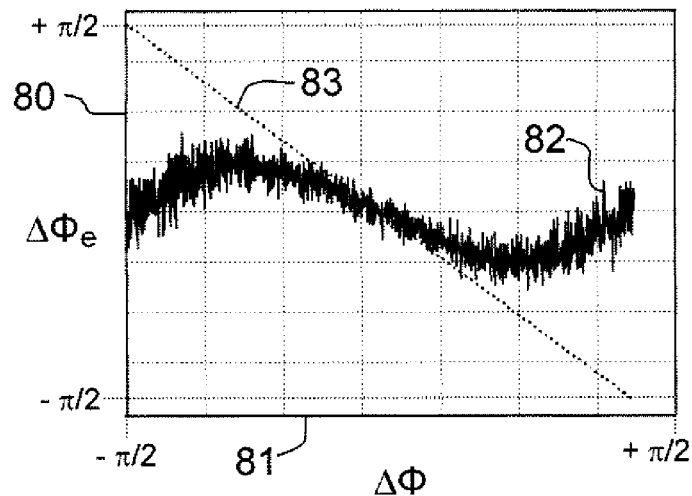
FIG. 6 gives an exemplary angle error measurement function obtained with low Eb/NO ratio after a first iteration.

FIG. 6 gives an exemplary angle error measurement function obtained with low Es/N0 ratio value by using the exemplary device implementing the method described previously. The angle error measurement function shows the difference between the value of the offset of the phase of the signal applied artificially by simulation (values read on y axis 80) and the value actually measured after application of the method (values read on x axis 81). The phase measurement results presented in FIG. 6 were obtained after integration over 101 symbols for Es/N0=0 dB. An algorithm that provides an estimation of the ideal offset would give results similar to the straight line 83. The result of the estimation after application of the method according to the invention 82 presents a linear region around zero, indicative of good algorithm performance.

Figure 7:
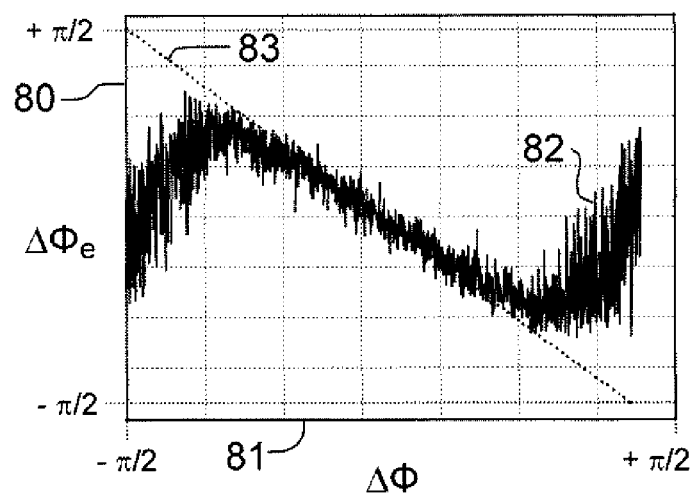
FIG. 7 gives an exemplary angle error measurement function obtained with low Eb/NO ration after a second iteration.

FIG. 7 presents the simulation results obtained after a second iteration. The linear range of the estimator is wider which means that estimation performance levels are improved.

The invention claimed is:

1. A method for tracking the phase of a signal modulated by an M-state continuous phase modulation, sampled so that at least two samples are obtained per symbol period and processed in portions of N symbols, the method comprising:
   a complex vector V(n) representative of the state of amplitude and phase of the received signal is determined for each symbol period with an offset of a half symbol period relative to the symbol rate of the receiver;
   a level measurement is performed for each symbol period on the real or imaginary part of two complex samples U(n) and U(n−1) distributed with an offset roughly of a half symbol period either side of the instant of estimation of the complex vector V(n);
   the complex vectors V(n) are associated for each symbol period with one of the M points of the constellation of the continuous phase modulation by a mapping function which takes as input the levels of the samples U(n) and U(n−1) and makes it possible to find the point of the constellation which is closest;
   an average estimation of the offset of the phase over a period of N symbols is calculated for each of the M points of the constellation of the continuous phase modulation by calculating the difference between the average estimation of the phase of the signal and the theoretical phase value associated with each point of the constellation of the continuous phase modulation;
   an absolute estimation of the offset of the phase over a period of N symbols is calculated by calculating the average of the average estimations of the offset of the phase associated with each of the M points of the constellation of the continuous phase modulation;
   a differential estimation of the offset of the phase over a period of N symbols is calculated by calculating the average of the average offset of the phase differences between consecutive points of the constellation.

2. The method according to claim 1, wherein the mapping function which can be used to associate the complex vectors V(n) with one of the M points of the constellation of the continuous phase modulation comprises a truth table based on the result of the projection of the complex samples U(n) and U(n−1) on the real or imaginary axis after having decided on a value according to the level detected, in other words, +1 for a projection level greater than 0 and −1 for a projection level less than 0, and mapping one of the M symbols of the constellation to a −1/+1 pair calculated for each pair of samples U(n) and U(n−1).

3. The method according to claim 1, wherein the received signal is equalized in frequency before the estimation of the complex vectors V(n).

4. The method according to claim 1, wherein the received signal is equalized before the samples U(n) and U(n−1) are processed by using an adaptive filter.

5. The method according to claim 1, wherein over the duration of the processing period for N symbols and for each point of the constellation, an average complex vector $<V_i(n)>$ is calculated using the vectors $V_i(n)$ associated with each of the points i of said constellation.

6. The method according to claim 5, wherein the average complex vectors $<V_i(n)>$ associated with each of the M points of the constellation is compared to the theoretical argument of the associated point of the constellation and is used to estimate the average offset of the phase for each of the M points of the constellation.

7. A method for synchronizing a signal modulated by an M-state continuous phase modulation, wherein the tracking method according to claim 1 is utilized, and:
   the phase of the received signal is corrected by configuring a phase-locked loop with the absolute estimation of the offset of the phase resulting from the application of the method;
   the symbol rate of the receiver is corrected by configuring an all-pass filter with programmable delay with a time delay value calculated using the differential estimation of the offset of the phase.

8. The method according to claim 7, wherein the time delay value used to track the symbol rate is calculated by using a proportional integral-type method.

9. The method according to claim 7, wherein the estimation and the correction of the phase of the signal are performed iteratively, a first absolute estimation of the offset of the phase being conducted on N symbols of the signal, the residual error after correction be re-estimated after correction of the phase applied to these N symbols for a second correction, the process being able to be thus repeated a given number of times.

10. The method according to claim 9, wherein the absolute offset of the phase estimated after several successive iterations is the sum of the estimations of the offset of the phase obtained after each iteration.

11. A reception device implementing the synchronization method according to claim 7, said device comprising:
   a radio frequency circuit that can be used to convert the signal to baseband;
   processing means implementing the synchronization method according to claim 7;
   a memory area that can be used notably to store the complex vectors V(n), the levels of the samples U(n), the average estimations of the offset of the phase for each of the M points of the constellation of the modulation, and the overall average estimation of the offset of the phase over a period of N symbols.

* * * * *